(12) United States Patent
Bergmeier et al.

(10) Patent No.: US 9,974,227 B1
(45) Date of Patent: *May 22, 2018

(54) TUBELESS FERTILIZER KNIFE

(71) Applicant: Shield Industries, Inc., Hutchinson, KS (US)

(72) Inventors: Mike J Bergmeier, Hutchinson, KS (US); Logan Deane Hurlbut, Hutchinson, KS (US)

(73) Assignee: Shield Industries, Inc., Hutchinson, KS (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/949,404

(22) Filed: Nov. 23, 2015

Related U.S. Application Data

(63) Continuation-in-part of application No. 13/801,106, filed on Mar. 13, 2013, now Pat. No. 9,192,095.

(60) Provisional application No. 61/697,987, filed on Sep. 7, 2012.

(51) Int. Cl.
*A01C 5/06* (2006.01)
*A01C 23/02* (2006.01)

(52) U.S. Cl.
CPC ............ *A01C 5/062* (2013.01); *A01C 23/025* (2013.01)

(58) Field of Classification Search
CPC ... A01C 23/025; A01C 23/024; A01C 23/023; A01C 23/02; A01C 23/00; A01C 5/062; A01C 5/06; A01C 5/00
See application file for complete search history.

(56) References Cited

U.S. PATENT DOCUMENTS

| | | |
|---|---|---|
| 2,148,925 A | 2/1939 | Bochy |
| 2,598,121 A | 5/1952 | Hannibal |
| 2,619,054 A | 11/1952 | Bell |
| 2,684,617 A | 7/1954 | Johnston |
| 2,689,514 A | 9/1954 | Ferguson |
| 2,716,823 A | 9/1955 | Mullin |
| 2,734,439 A | 2/1956 | Padrick |
| 2,768,591 A | 10/1956 | James |
| 2,842,077 A | 7/1958 | Morrison |
| 2,849,969 A | 9/1958 | Taylor |
| 2,874,656 A | 2/1959 | Bennett |
| 2,904,119 A | 9/1959 | Hunter |
| 2,924,187 A | 2/1960 | Zimmerman |
| 3,002,574 A | 10/1961 | Padrick |
| 3,092,052 A | 6/1963 | Anderson |

(Continued)

FOREIGN PATENT DOCUMENTS

| | | |
|---|---|---|
| AU | 217205 | 3/1957 |
| CA | 496012 | 9/1953 |

(Continued)

*Primary Examiner* — Christopher J. Novosad
(74) *Attorney, Agent, or Firm* — Robert Blinn

(57) ABSTRACT

An improved fertilizer knife presents a leading edge, a first flexible fertilizer tube receiving portion and a second fertilizer tube receiving portion. The first and second flexible tube receiving portions are precision cast to frictionally receive the distal end of a flexible polymer fertilizer tube. The first and second flexible tube receiving portions are adapted so that the second flexible tube receiving portion can be mounted to the first flexible tube receiving portion. Both flexible tube receiving portions also each have at least one opening at their lower ends for allowing fertilizer to escape from a flexible fertilizer tube.

3 Claims, 11 Drawing Sheets

(56) References Cited

U.S. PATENT DOCUMENTS

| | | |
|---|---|---|
| 3,177,830 A | 4/1965 | Zimmerman |
| 3,188,988 A | 6/1965 | Peck |
| 3,259,087 A | 7/1966 | Horton |
| 3,289,772 A | 12/1966 | Blackwood |
| 3,296,985 A | 1/1967 | Shelton |
| 3,517,752 A | 6/1970 | Glee |
| 3,618,538 A | 11/1971 | Brannan |
| 3,919,951 A | 11/1975 | Williams |
| 3,970,445 A | 7/1976 | Gale et al. |
| 4,033,271 A | 7/1977 | Williams et al. |
| 4,132,181 A | 1/1979 | Smith |
| 4,201,142 A | 5/1980 | Stump |
| 4,269,274 A | 5/1981 | Robertson et al. |
| 4,333,536 A | 6/1982 | Ryan |
| 4,355,589 A | 10/1982 | Wetmore |
| 4,446,927 A | 5/1984 | Robertson |
| 4,592,294 A | 6/1986 | Dietrich et al. |
| 4,616,580 A | 10/1986 | Moore et al. |
| 4,628,839 A | 12/1986 | Edmisson |
| 4,638,748 A | 1/1987 | Kopecky |
| 4,719,862 A | 1/1988 | Edmisson |
| 4,773,340 A | 9/1988 | Williams et al. |
| 4,834,189 A | 5/1989 | Peterson et al. |
| 4,869,328 A | 9/1989 | Carroll |
| 4,893,434 A | 1/1990 | Knipp et al. |
| 5,310,009 A | 5/1994 | Rowlett |
| 5,314,029 A | 5/1994 | Rowlett |
| 5,452,673 A | 9/1995 | Bruce |
| 5,787,994 A | 8/1998 | Friesen |
| 6,167,821 B1 | 1/2001 | Beggs |
| 6,318,279 B1 | 11/2001 | Rowlett et al. |
| 6,382,114 B1 | 5/2002 | Lanpher |
| 6,397,767 B1 | 6/2002 | Dietrich, Sr. |
| 6,405,665 B1 | 6/2002 | Henry et al. |
| 6,745,709 B2 | 6/2004 | Rowlett et al. |
| 6,871,709 B2 | 3/2005 | Knobloch et al. |
| 6,955,131 B2 | 10/2005 | Beaujot et al. |
| 6,973,884 B2 | 12/2005 | Dietrich, Sr. |
| 7,568,439 B2 | 8/2009 | Steinlage et al. |
| 8,161,894 B1 | 4/2012 | Albright et al. |
| 9,192,095 B1 * | 11/2015 | Bergmeier ............ A01C 23/025 |

FOREIGN PATENT DOCUMENTS

| | | |
|---|---|---|
| CA | 945183 | 4/1974 |
| DE | 552793 | 11/1930 |
| DE | 35151 | 1/1965 |
| FR | 657738 | 5/1929 |
| FR | 904577 | 11/1945 |
| GB | 677874 | 8/1952 |
| GB | 1141320 | 1/1969 |
| NL | 7409495 | 7/1974 |

\* cited by examiner

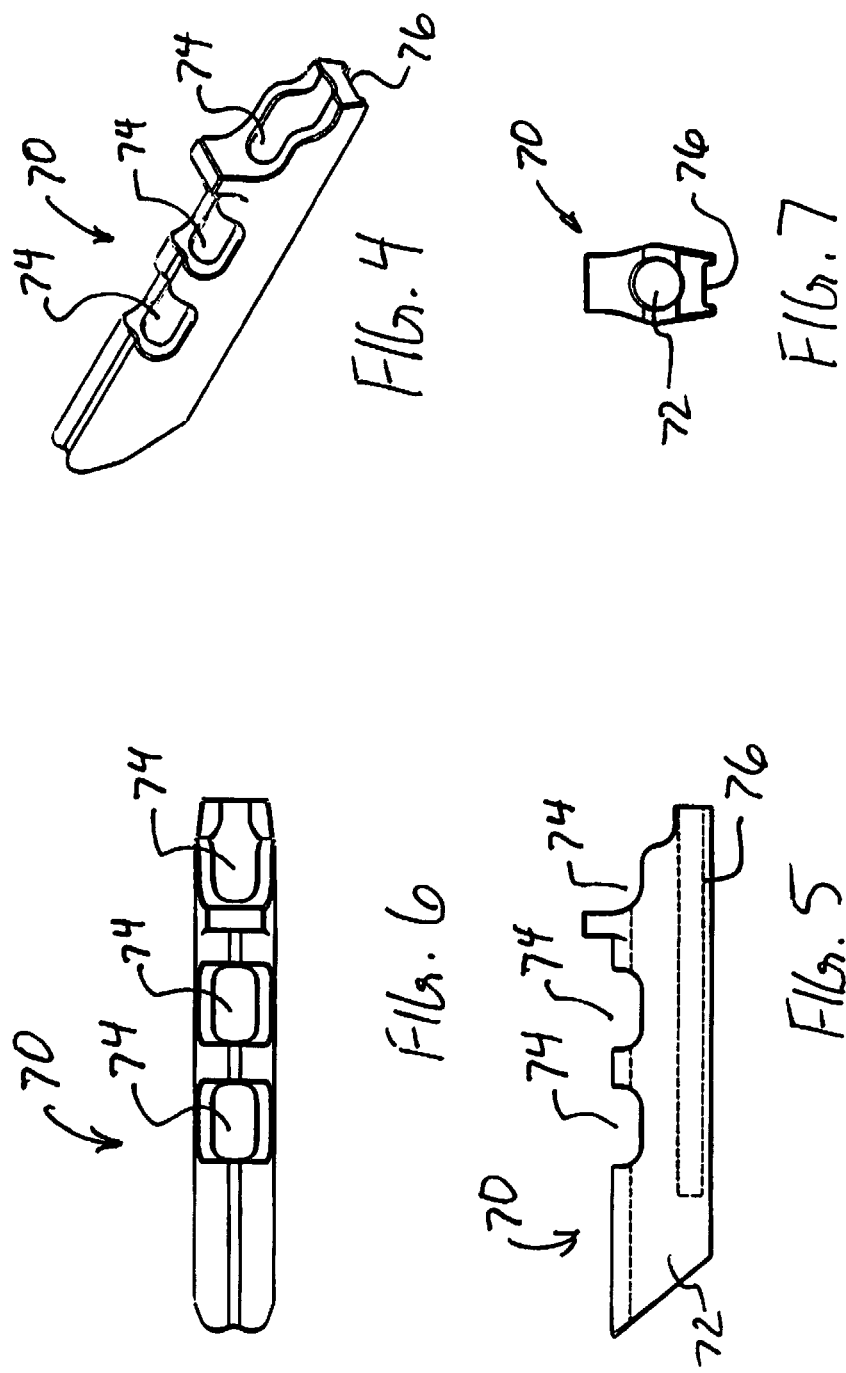

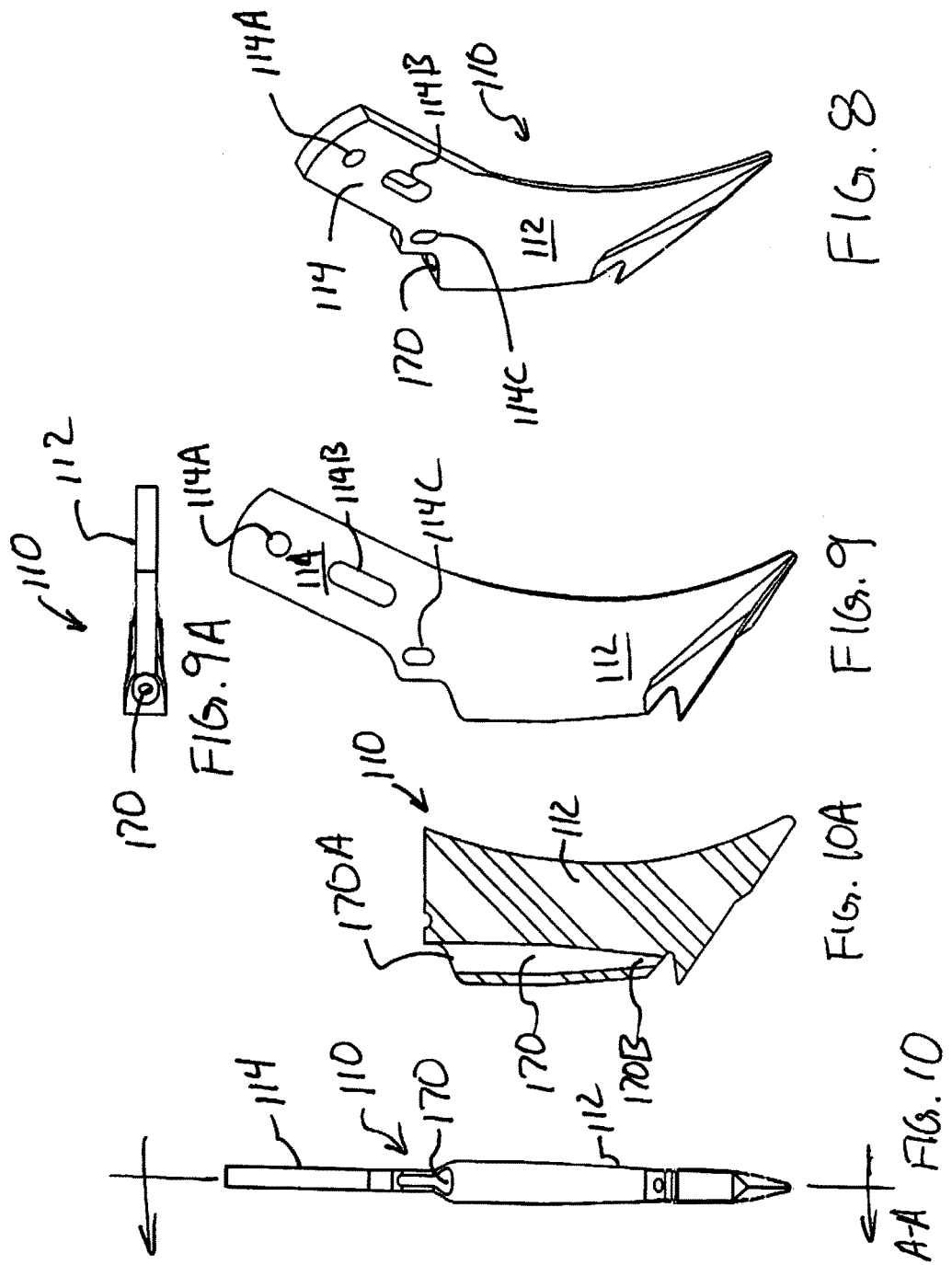

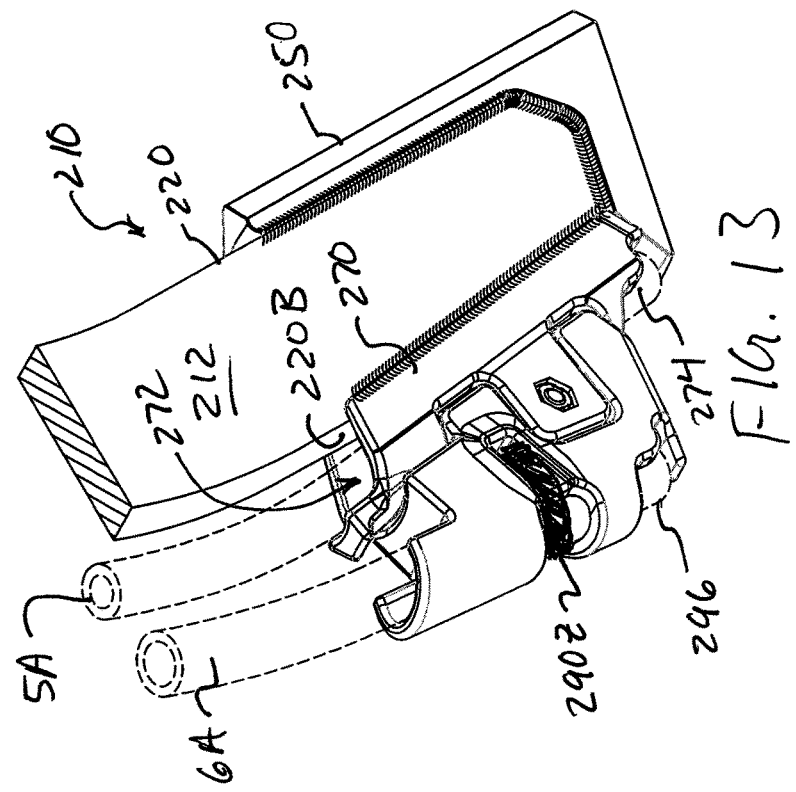
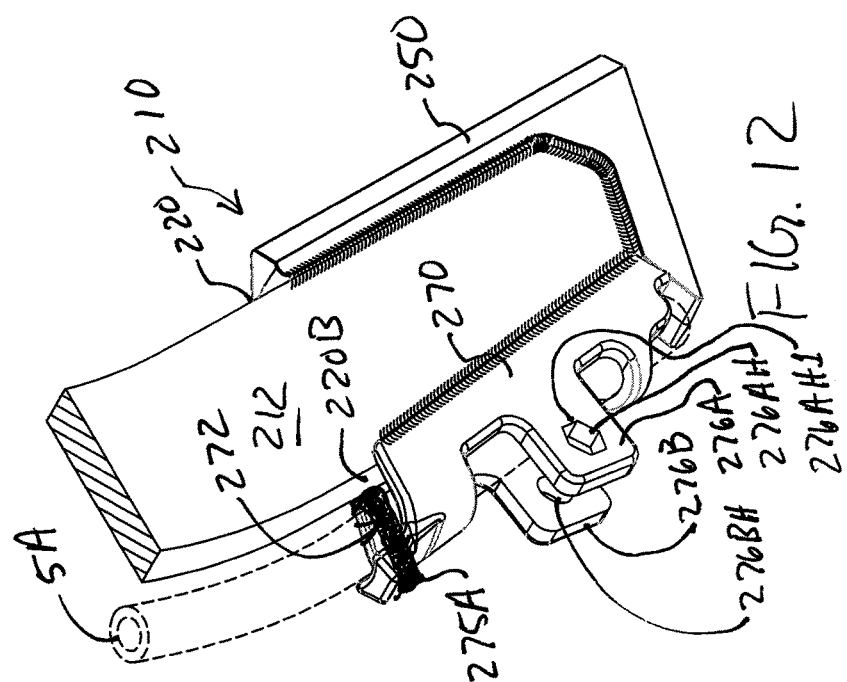

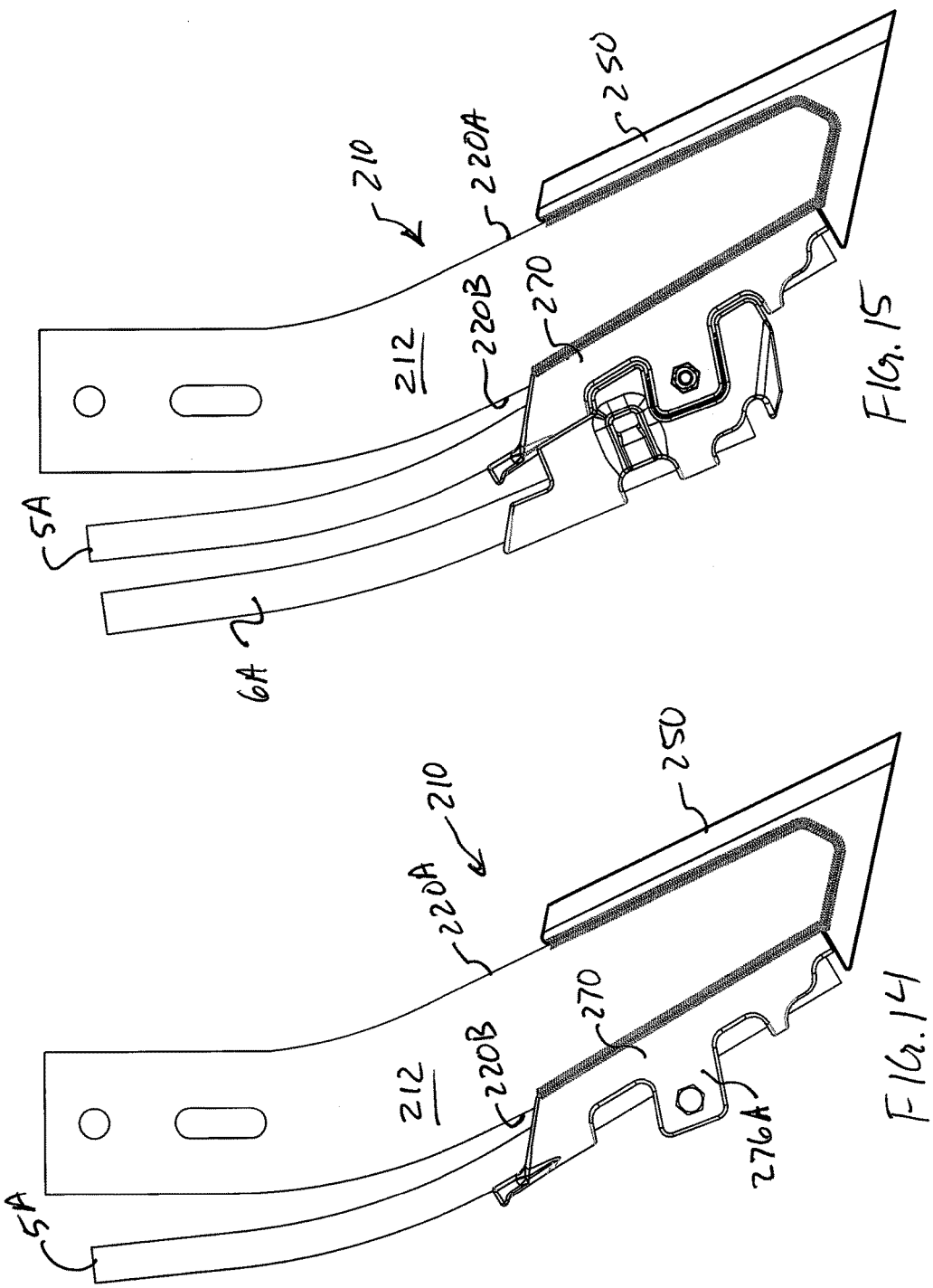

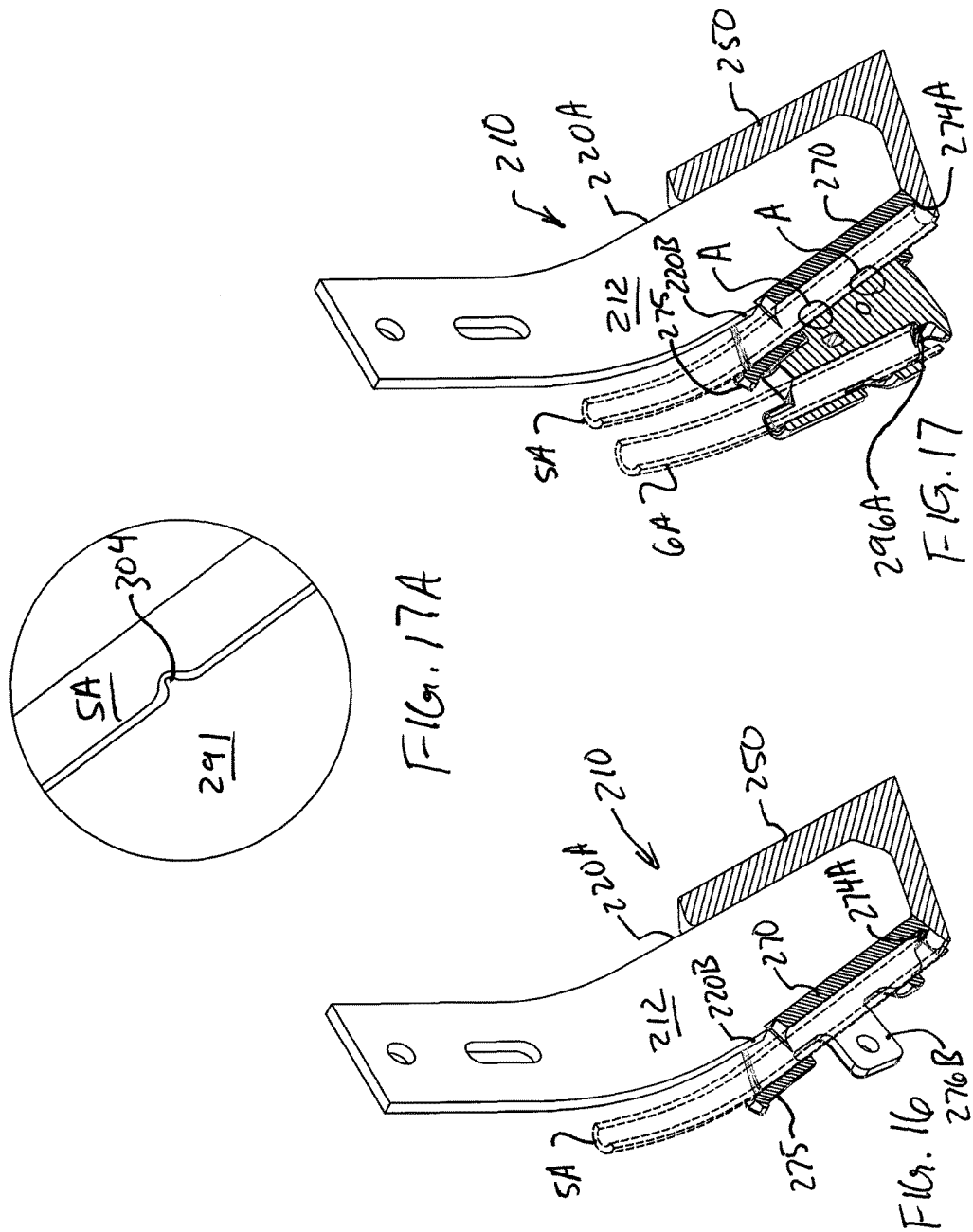

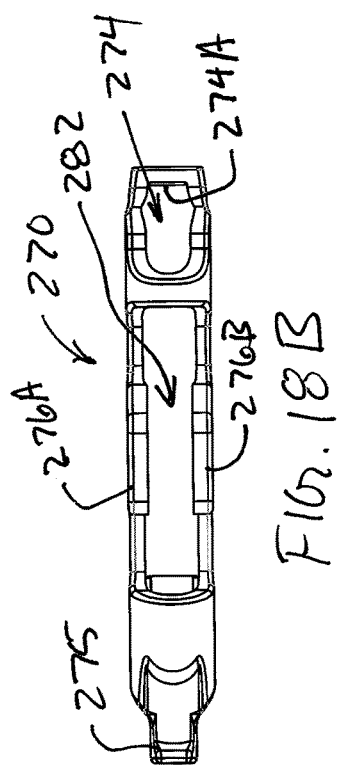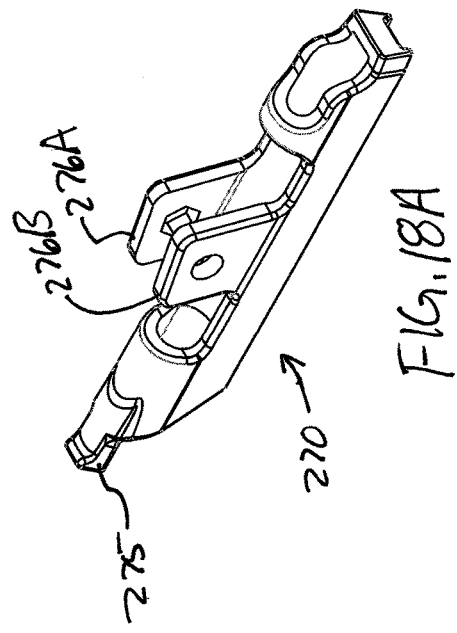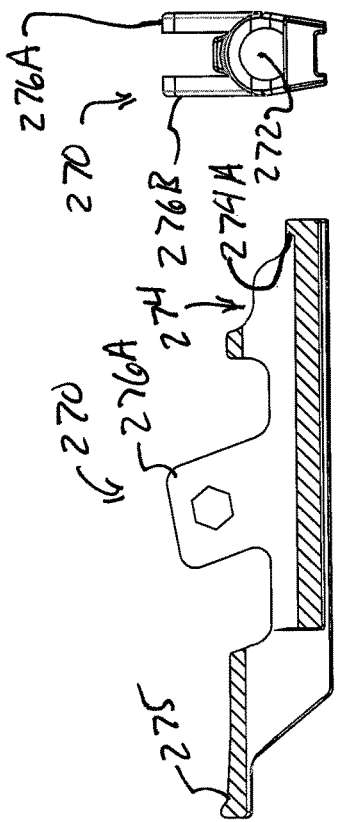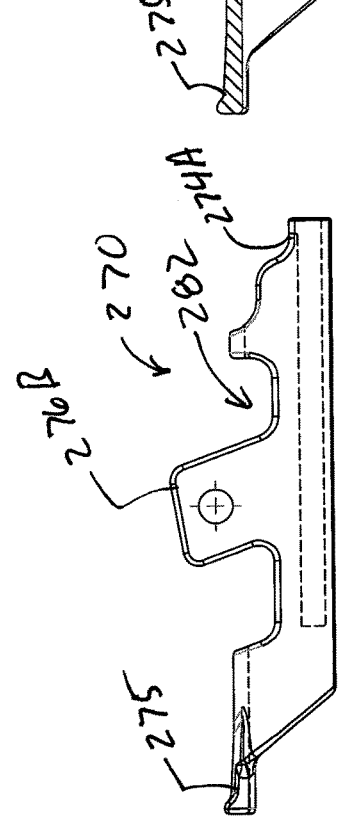

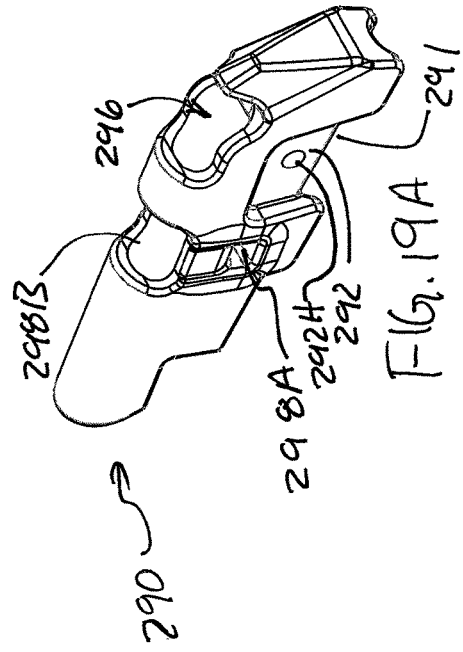
FIG. 19A
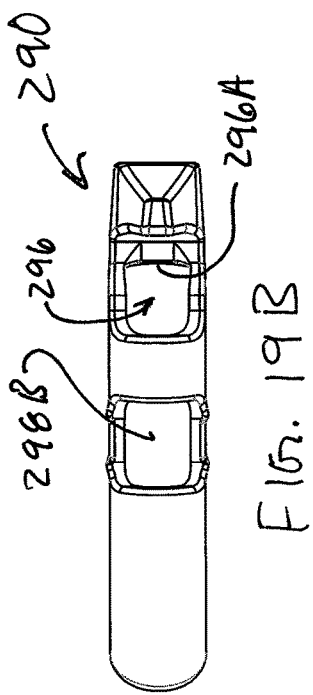
FIG. 19B
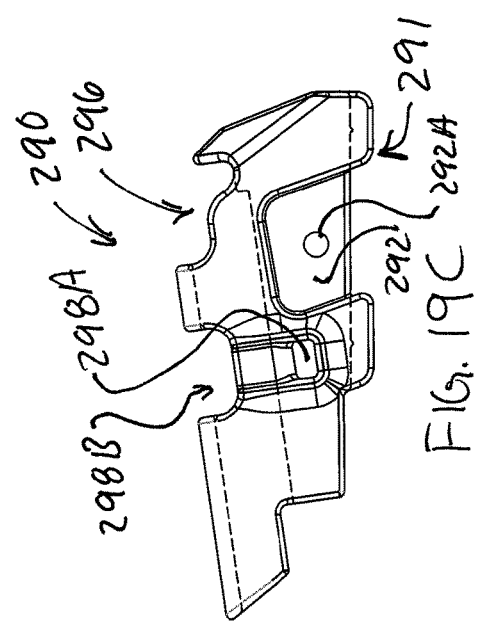
FIG. 19C
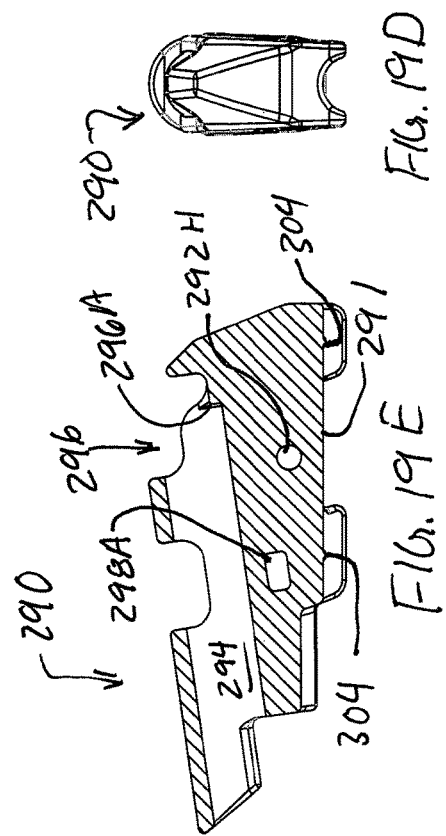
FIG. 19D
FIG. 19E

TUBELESS FERTILIZER KNIFE

CROSS REFERENCES TO RELATED APPLICATIONS

This application is a continuation-in-part of U.S. non-provisional patent application Ser. No. 13/801,106 filed on 13 Mar. 2013, which is incorporated herein by reference.

U.S. non-provisional patent application Ser. No. 13/801,106 claimed the benefit of U.S. provisional application Ser. No. 61/697,987 filed on Sep. 7, 2012 which is incorporated herein by reference.

FIELD OF THE INVENTION

This invention relates to an improved fertilizer applicator knife that is operable for receiving a flexible fertilizer tube attached to a fertilizer implement.

BACKGROUND OF THE INVENTION

Fertilizer knives are employed by farmers to deliver nitrogen enriching fertilizers such as anhydrous ammonia or liquid fertilizers to a targeted zone beneath the surface of the soil of a crop field while causing a minimum of disruption to the structure of the upper layer of the topsoil. Typically, a fertilizer implement carries a pattern of fertilizer knives spaced for simultaneously delivering fertilizer to a plurality of parallel furrows.

Typical prior art fertilizer knives are cast as one piece or are more commonly a combination of a tough steel knife blank and cast iron knife point that is welded to the knife blank. The cast iron knife point has a wedge-shaped leading edge for cutting through soil. With a typical prior art fertilizer knife, a steel fertilizer tube is welded to the trailing edge of the knife blank. For most fertilizer knives, the steel fertilizer tube is welded to the back surface of the knife blank and the fertilizer tube terminates at the base of the knife. Because the fertilizer knife is usually fashioned from a combination of steel and cast iron, the fertilizer tube is fashioned from steel so it can be welded to the trailing portion of the fertilizer knife. The use of a steel fertilizer knife tube presents two disadvantages. First, the skilled reader may recall that the knife shank is bolted to an implement shank with two bolts—an upper bolt and a lower bolt. The lower bolt is designed to function as a structural fuse. If the fertilizer knife encounters an obstacle during use, the lower bolt fails and allows the fertilizer knife to swing back without damaging the fertilizer implement. However, when the lower attachment bolt fails, and, as the fertilizer knife swings back, the steel fertilizer knife tube is often damaged beyond repair. While this action has protected the implement from damage, a damaged fertilizer knife tube makes it necessary to replace the knife. Although an operator will often have spare shank bolts on hand, an operator will usually not have a replacement fertilizer knife available. Accordingly, the damaged fertilizer tube often causes a delay in operations. Second, in the case of anhydrous ammonia, NH3, which boils at approximately −30° F., it is highly advantageous to deliver NH3 to the soil in liquid form. This is because the liquid NH3 absorbs large amounts of heat when it boils. Further, vaporization of NH3 in the highly thermally conductive steel fertilizer knife tube causes great amounts of heat to be transferred into the fertilizer knife tube from the steel and cast iron knife. This is because the heat of vaporization of liquid NH3 is far greater than its specific heat. In relatively cool soil conditions, this can cause ice to accumulate at the lower end of the fertilizer knife which greatly reduces the utility and function of the fertilizer knife. What is needed is a fertilizer knife that eliminates the above noted disadvantages inherent in a fertilizer knife having a steel fertilizer tube.

BRIEF DESCRIPTION OF THE INVENTION

The above described needs are addressed by an improved fertilizer knife having a knife point that presents a leading edge and rear tube receiving portion. The rear tube receiving portion is precision cast to frictionally receive the distal end of the flexible polymer fertilizer tube that is connected, at least indirectly, to an implement fertilizer tank. The rear tube receiving portion also has at least one opening at the lower end thereof for allowing fertilizer to escape from the flexible polymer tube into the surrounding soil during a fertilizing operation.

BRIEF DESCRIPTION OF THE DRAWINGS

FIG. 4 is a perspective view of a tube receiving portion of a tubeless fertilizer knife.

FIG. 5 is a side view of the tube receiving portion of a tubeless fertilizer knife.

FIG. 6 is a top view of the tube receiving portion of a tubeless fertilizer knife.

FIG. 7 is an end view of the tube receiving portion of a tubeless fertilizer knife.

FIG. 8 is a perspective view of a second embodiment of a tubeless fertilizer knife.

FIG. 9 is a side view of the second embodiment of the tubeless fertilizer knife.

FIG. 9A is a top view of the second embodiment of the tubeless fertilizer knife.

FIG. 10 is a front view of the second embodiment of the tubeless fertilizer knife.

FIG. 10A is a partial cross-section side view of the second embodiment of the tubeless fertilizer knife taken from plane A-A of FIG. 10.

FIG. 12 is a perspective view of a third embodiment of the tubeless fertilizer knife shown with a first welded-on tube receiving portion.

FIG. 13 is a perspective view of the third embodiment of the tubeless fertilizer knife with a second bolt-on tube receiving portion fastened to the first welded-on tube receiving portion.

FIG. 14 is a side view of the third embodiment of the tubeless fertilizer knife shown with the first welded-on receiving portion.

FIG. 15 is a side view of the third embodiment of the tubeless fertilizer knife shown with the second bolt-on tube protector casting fastened to the first welded-on tube receiving portion.

FIG. 16 is a perspective cross section view of the third embodiment of the tubeless fertilizer knife shown without the second bolt-on tube receiving portion attached.

FIG. 17 is a perspective cross section view of the third embodiment of the tubeless fertilizer knife shown with the second bolt-on receiving portion attached.

FIG. 17A is a magnified view of one of detail areas A indicated in FIG. 17 showing a tube engaging tooth which projects from a forward surface of the of second bolt-on tube receiving portion shown in FIG. 17.

FIG. 18A is a perspective view of the first welded-on receiving portion of the third embodiment.

FIG. 18B is a top view of the first welded-on receiving portion of the third embodiment.

FIG. 18C is a side view of the first welded-on receiving portion of the third embodiment.

FIG. 18D is an end view of the first welded-on receiving portion of the third embodiment.

FIG. 18E is a cross section view of the first welded-on receiving portion of the third embodiment taken from plane A-A indicated in FIG. 18D.

FIG. 19A is a perspective view of the second bolt-on receiving portion of the third embodiment.

FIG. 19B is a top view of the second bolt-on receiving portion of the third embodiment.

FIG. 19C is a side view of the second bolt-on receiving portion of the third embodiment.

FIG. 19D is an end view of the second bolt-on receiving portion of the third embodiment.

FIG. 19E is a cross section view of the second bolt-on tube receiving portion of the third embodiment taken from plane A-A indicated in FIG. 18D.

DETAILED DESCRIPTION

Figure 1:
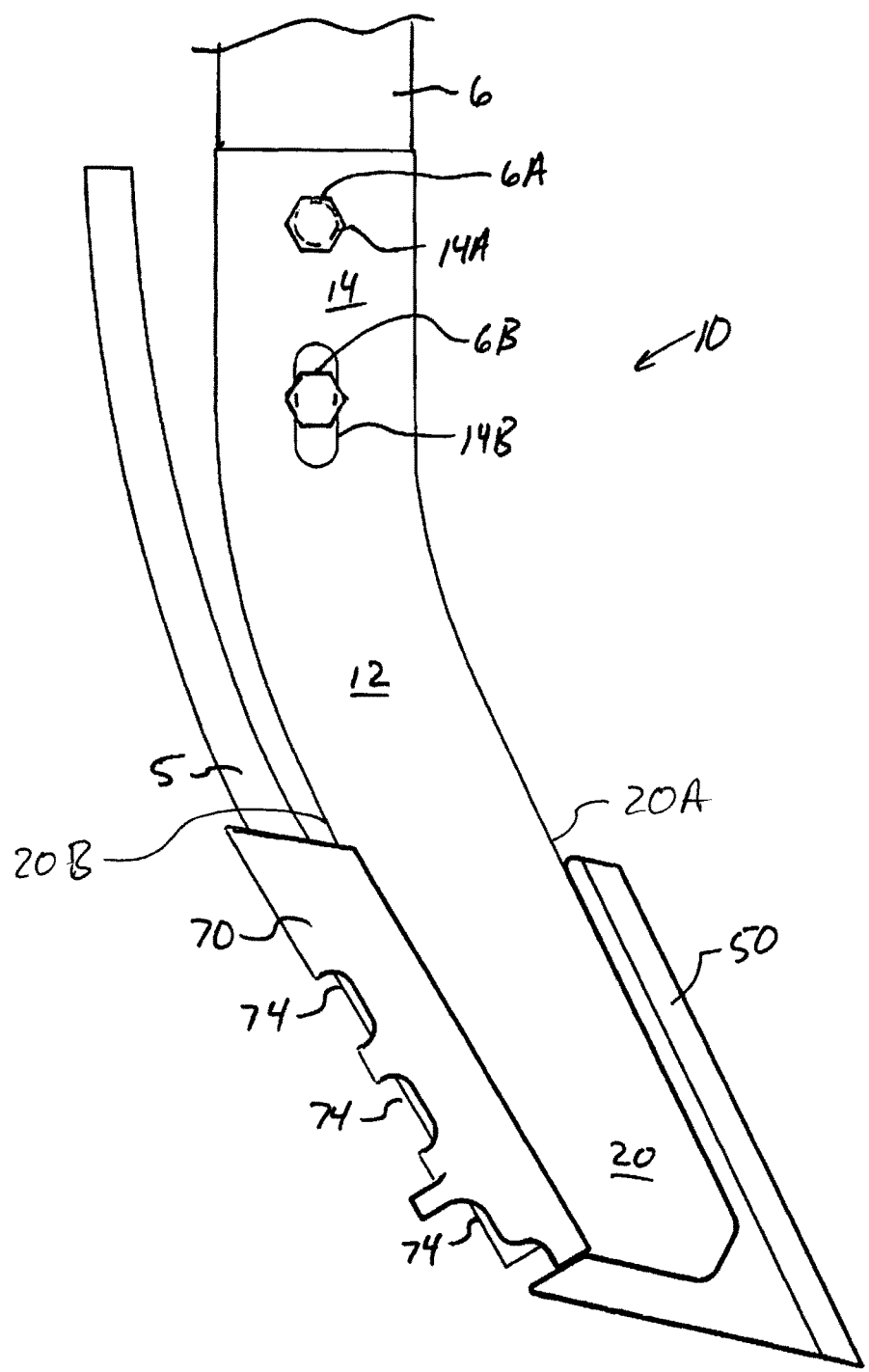
FIG. 1 is a side view of the tubeless fertilizer knife with a flexible fertilizer tube shown in phantom.

Referring to the drawings, FIG. 1 shows a first embodiment for an improved fertilizer knife 10. Fertilizer knife 10 is suitable for bolting with bolts 6A and 6B to a fertilizer implement shank 6. The skilled reader should refer to U.S. Pat. Nos. 8,161,894 and 7,568,439, which are incorporated herein by reference for background concerning the general arrangement for securing a fertilizer knife to a fertilizer implement and the general configuration and use of such a fertilizer knife. As can be seen in FIG. 1, the fertilizer knife 10 includes a knife blank 12, a point portion 50 and a tube receiving portion 70. Knife blank 12 includes an upper portion 14 suitable for mounting to an implement shank as shown in FIG. 1 and a lower portion 20. Lower portion 20 includes a leading edge 20A and a trailing edge 20B. Point portion 50 is welded to leading edge 20A. Tube receiving portion 70 is welded to trailing edge 20B. As can be best seen in FIG. 3, upper portion 14 has an upper bolt hole 14A and a lower bolt slot 14B. Upper and lower bolt hole 14A and lower bolt slot 14B are arranged generally vertically on upper portion 14. An elongated slot is used for lower bolt slot 14B to accommodate any varying bolt positions that might occur for various fertilizer implements. Bolts 6A and 6B are used to attach knife 10 to an implement shank 6 as shown in FIG. 1. As noted above, lower bolt 6B is designed to shear off when knife 10 encounters an obstacle prior to any significant damage being inflicted on the fertilizer implement.

Typically, knife blank 12 is fashioned from tough steel capable of transferring bending loads, while point portion 50 and tube receiving portion 70 are typically fashioned from hard, but brittle cast iron suitable for withstanding the abrasion that occurs when fertilizer knife 10 is drafted through soil.

Figure 2:
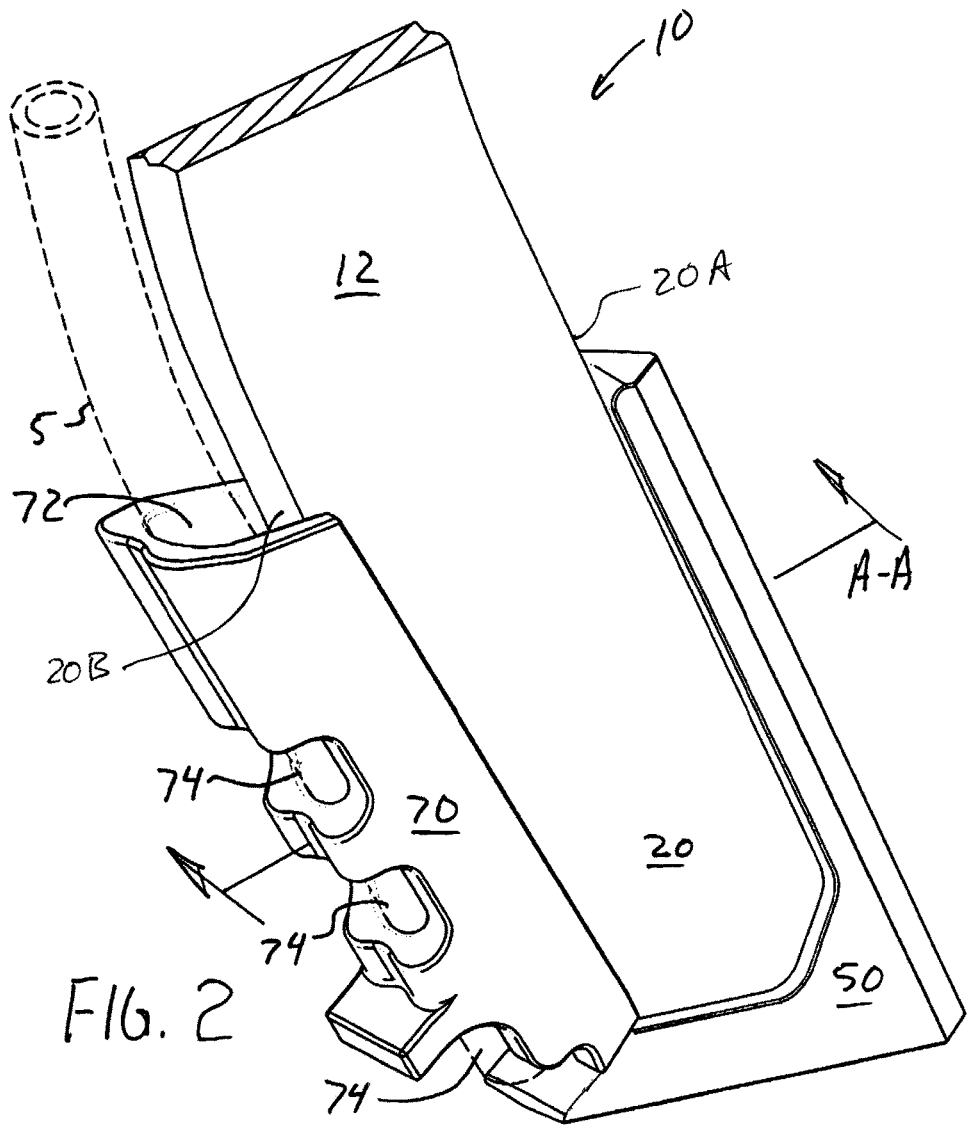
FIG. 2 is a perspective view of the fertilizer knife of FIG. 1 with a flexible fertilizer tube shown in phantom.
Figure 3:
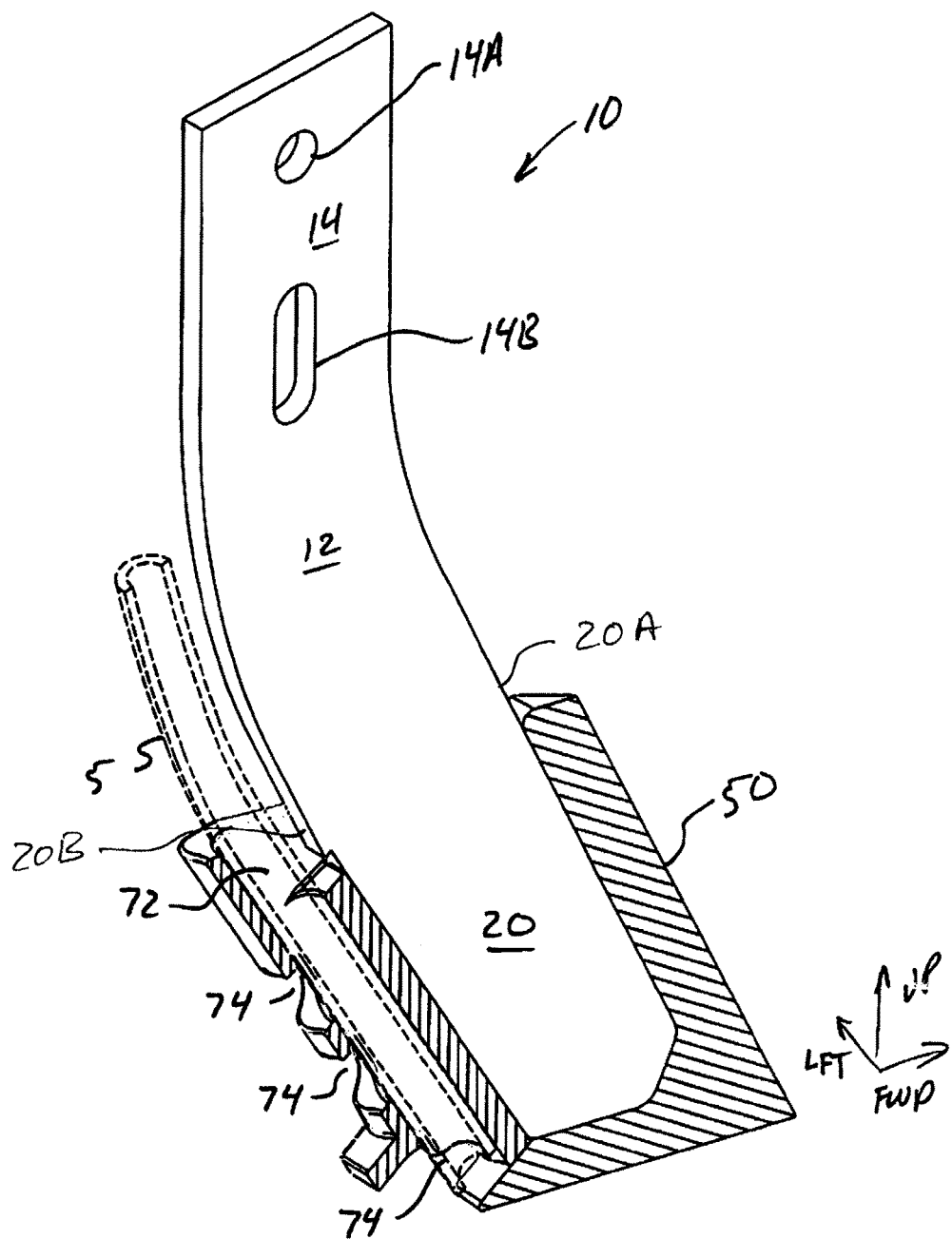
FIG. 3 is a cross-section perspective view of the fertilizer knife of FIG. 2 taken from plane A-A of FIG. 2.

As can be seen in FIG. 1, point portion 50 is welded to the lower end of knife blank 12 and generally has a configuration well known to those skilled in the art, with the exception that point portion 50 must be designed so it does not interfere with tube receiving portion 70. Tube receiving portion 70 is welded to trailing edge 20B of the lower end of knife blank 12 as shown in FIGS. 1 and 2. Tube receiving portion 70 is a precision cast iron part. A tube channel 72 extends from the upper end of tube receiving portion 70 to at least one opening 74 at the lower end of tube receiving portion 70. Tube receiving portion 70 is oriented so that tube channel 72 is partially upright and angled forward as shown in FIG. 2. In this example, tube channel 72 is preferably tubular and has internal dimensions that are adapted for frictionally receiving a standard, flexible polymer anhydrous ammonia fertilizer implement tube 5 as shown in FIG. 3. In this example, tube 5 is fashioned from ethylene-vinyl acetate (EVA) as is well known to those skilled in the art. Although channel 72 is cylindrical in this example, it does not have to be cylindrical. Those skilled in the art know that EVA fertilizer tubes are flexible, and for most applications, have a standard outside diameter, which in this example is 0.59 inch. Thus, in this example, the inside diameter of the channel 72 is generally 0.61 inch. Preferably the diameter of channel 72 should be held within a narrow tolerance and should not fall below the diameter of tube 5. It is important that it is always possible (or at least with only very rare exceptions) for an operator to insert tube 5 into channel 72. Those skilled in the art also know that ethylene-vinyl acetate is a polymer that is a thermal insulator (especially when compared to steel). For reasons noted above, this is a useful property for a tube for conveying liquid NH3 to a release point.

In this example embodiment, flexible EVA fertilizer tube 5 is received by channel 72 of tube receiving portion 70. Tube 5 terminates at the lower end of channel 72. A series of openings 74 are defined in the rear wall of tube receiving portion 70 which communicate with the lower end of channel 72. Openings 74 are intended to accommodate various configurations that might be used with tube 5 where various openings may be defined in tube 5. A single opening 74 at the bottom end of channel 72 may be sufficient for many applications.

The skilled reader will appreciate from the above description that with this first embodiment fertilizer knife 10, NH3 is conveyed to a release point at the lower end of channel 72 of tube receiving portion 70 through EVA fertilizer tube 5 which has a relatively low thermal conductivity and not through a thermally conductive steel tube as is the case with prior art fertilizer knifes. Thus, liquid NH3 is more likely to be released from the lower end of the knife as a liquid and is less likely to boil and absorb great amounts of heat as it reaches the release point. The skilled reader will also appreciate that since tube 5 (shown in FIG. 3) is flexible, a failure of a lower attachment bolt 6B (shown in FIG. 2) will result in no damage to any tube that is needed to convey fertilizer to the release point. Merely replacing the sheared lower bolt 6B is all that would be needed to bring fertilizer knife 10 back into operation.

Figure 11:
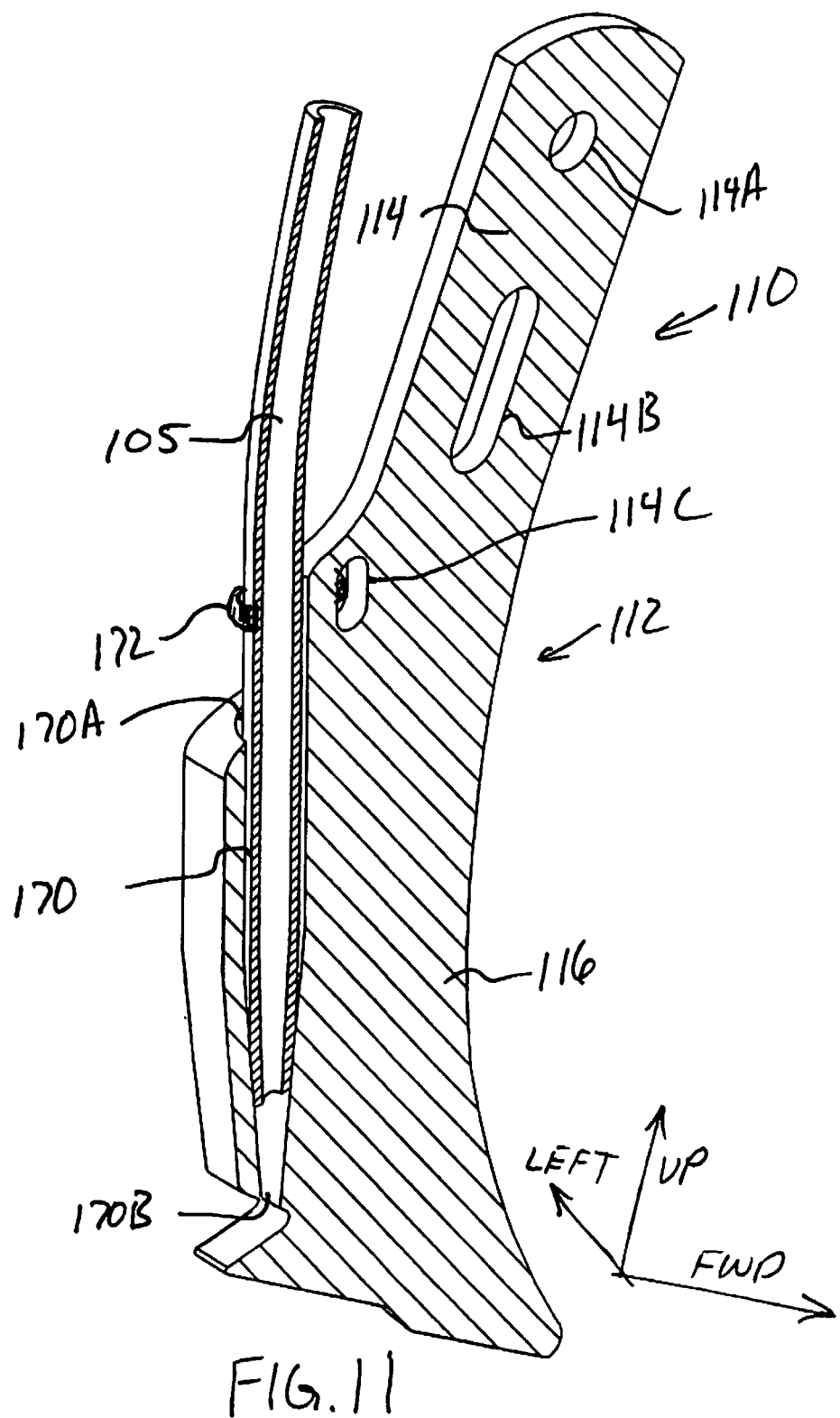
FIG. 11 is a perspective cross-section view of the second embodiment of the tubeless fertilizer knife taken from plane A-A of FIG. 10.

Referring to the drawings, FIG. 8 shows a second embodiment for an improved fertilizer knife 110 which is suitable for bolting to a fertilizer implement shank (not shown) as described above. As can be seen in FIG. 11, fertilizer knife 110 includes knife body 112 which has an upper attachment portion 114 and a lower blade portion 116. As with knife blank 12 described above, upper portion 114 of knife body 112 has an upper bolt hole 114A and a lower bolt slot 114B. Upper and lower bolt hole 114A and lower bolt slot 114B are also arranged generally vertically on upper portion 114. As described above, an elongated slot is used for lower bolt slot 114B to accommodate any varying bolt positions that might occur for various fertilizer implements. As can be seen in FIG. 11, a generally upright but forwardly angled tube channel 170 is defined for receiving a flexible fertilizer tube 105 (shown in phantom in FIG. 11). Tube channel 170 slopes mostly down and partially forward as shown in FIG. 11. Knife 110 is preferably a precision cast iron part.

Tube channel extends from an upper opening 170A and a lower opening 170B. In this example, tube channel 170 has a specific shape which is adapted to receive a typical rubber tube used for delivering liquid fertilizer. As can be seen by inspecting FIGS. 3 and 3A, in this example, tube channel 170 has an oval shape that is approximately 15% to 25% wider in the longitudinal direction than in the transverse direction. In this example, tube channel 170 at its upper end is approximately 19% wider in the longitudinal direction than in the transverse direction. Further, as can be best seen by referring to FIG. 10A, channel 170 tapers between a location that is generally halfway between its upper opening and its lower opening and lower opening 170B so that channel 170 is substantially narrower at lower opening 170B.

As can be best understood by consulting FIG. 11, a flexible fertilizer tube 105 is inserted as far as possible into channel 170. Preferably, a zip tie 172 (shown as if cut away in FIG. 11) or a standard hose clamp (not shown) is secured by using a clamp opening 114C in order to firmly clamp fertilizer tube 105 to the back surface of lower portion 116 of knife body 112. With this type of fertilizer knife, a liquid fertilizer, which includes various fertilizing components dissolved in water, is delivered through tube 105. The boiling of a liquid fertilizer and the resulting accumulation of ice is not a concern in this case for second embodiment fertilizer knife 110. However, as noted above, the welded steel fertilizer tube has been eliminated from the fertilizer knife so that should knife 110 pivot back as a result of encountering an obstacle, flexible tube 105 is very unlikely to break or be damaged. Thus, by using second embodiment fertilizer knife 110, an operator can resume operations should the lower attach bolt fail by merely pivoting knife 110 back into position and replacing the sheared lower bolt.

Referring to the drawings, FIGS. 12-17 show a third embodiment for an improved fertilizer knife 210. Fertilizer knife 210 is suitable for mounting to a fertilizer implement shank as described for fertilizer knife 10 above. As can be seen in FIG. 12, the fertilizer knife 10 includes a knife blank 212, a point portion 250 a first welded-on flexible tube receiving portion 270 and a second bolt-on flexible tube receiving portion 290. Knife blank 212 is essentially identical to knife blank 12 of fertilizer knife 10 described above. Point portion 250 is welded to leading edge 220A and is essentially identical to point portion 50 of fertilizer knife 10 described above. First welded-on tube receiving portion 270 is welded to a trailing edge 220B of knife blank 212 as was the case for tube receiving portion 70 of fertilizer knife 10. Second bolt-on flexible tube receiving portion 290 is bolted to first welded-on first tube receiving portion 270 as will be described in greater detail below.

As was the case with tube receiving portion 70 of fertilizer knife 10, first welded-on flexible tube receiving portion 270 of third embodiment fertilizer knife 210 is a precision cast part which is welded to trailing edge 220B of the lower end of knife blank 212 as shown in FIGS. 12-17. A tube channel 272 extends from the upper end of tube receiving portion 270 to at least one opening 274 at the lower end of first tube receiving portion 270. First flexible tube receiving portion 270 is oriented so that tube channel 272 is partially upright and angled forward as shown in FIG. 12. In this example, tube channel 272 is preferably tubular and has internal dimensions that are adapted for frictionally receiving a standard, flexible polymer anhydrous ammonia fertilizer implement tube 5A as shown in FIGS. 12-17. In this example, tube 5A is fashioned from ethylene-vinyl acetate (EVA) as described above in the detailed description for fertilizer knife 10. The inside diameter of tube channel 272 is sized to register with the outside diameter of a standard EVA tube as is also described above in the detailed description for fertilizer knife 10. At the lower end of tube channel 272 adjacent opening 274 is a tube stop 274A. In this example, tube stop 274A is a portion of casting material which is arranged to present a ledge for stopping tube 5A before the lower end of tube 5A makes contact with point portion 250 which would obstruct tube 5A.

As can be seen in FIG. 14, first flexible tube receiving portion 270 presents a tie-off hook 275 which is located at the upper end of first tube receiving portion 270. Tie-off hook 275 is situated so that a hose clamp 275A. Hose clamp 275A is preferably a typical hose clamp of the type which includes a worm gear which engages a series slots in a metal strap. The worm gear is driven by a screw driver to tighten the metal strap around the hose. Hose claim 275A is shown in FIG. 12 only. Clamp 275A may be tightened around tube 5A in order to secure tube 5A to first flexible tube receiving portion 270 without interfering with the upper end of first tube receiving portion 270.

As can be seen in FIGS. 14-17, first flexible tube receiving portion 270 also presents a pair of parallel tabs 276A and 276B. Parallel tabs 276A and 276B extend from the back edge of first tube receiving portion 270, are generally flat, spaced from each other and are oriented to be generally parallel to each other and to a the side surfaces of knife blank 212. Parallel tabs 276A and 276B present aligned bolt holes 276AH and 276BH which are adapted to receive a fastener, which, in this example is preferably a hex bolt. In this example, bolt hole 276AH of tab 276A includes a hexagonally shaped recess 276AH1, which is shaped to receive and secure the hexagonal head of a hex bolt. As can be best seen in FIG. 12, first flexible tube receiving portion 270 presents an opening 282 which extends along the back side of first flexible tube receiving portion 270 between the upper and lower ends of first flexible tube receiving portion 270.

As was noted above, second bolt-on flexible tube receiving portion 290 is adapted so that it is able to be bolted to first flexible tube receiving portion 270. As can be seen in FIGS. 13, 15 and 17 second flexible tube receiving portion 290 is shaped to fit up with first flexible tube receiving portion 270. Most importantly, second flexible tube receiving portion 290 presents a recessed tab 292 which matches and is received between parallel tabs 276A and 276B of first flexible tube receiving portion 270. Further, in this example, the opposing sides of recessed tab 292 defines opposing recesses with the rest of the body of second flexible tube receiving portion 290 so that parallel tabs 276A and 276B and recessed tab 292 fit together. As can be best seen in FIG. 19E, a hole 292H is defined in recessed tab 292 which aligns with holes 276AH and 276BH of parallel tabs 276A and 276B respectively, so that a bolt may be employed to fasten second tube receiving portion 290 to first tube receiving portion 270.

As was the case with first flexible tube receiving portion 270, second flexible tube receiving portion 290 presents a tube channel 294 which is suitable for receiving a second tube 6A. The lower end of second flexible tube receiving portion 290 also provides an opening 296 which is suitable for the release of fertilizer carried by tube 6A. As can be best seen in FIG. 17, a tube stop ledge 296A is defined at the lower end of tube channel 294. Tube stop ledge 296 stops the advancing motion of tube 6A and retains it in place. As can be best seen in FIG. 19E, tube receiving portion 290 also presents a transverse zip tie opening 298A which extends transversely through the body of tube receiving portion 290 in front of tube channel. Second flexible tube receiving portion 290 also presents an open portion 298B which exposes tube 6A on the rear side of second tube receiving portion 290 opposite zip tie opening 298A. A second hose clamp 290Z (shown in FIG. 13 only) may be tightened around tube 6A and received through hose clamp opening 298A and tightly secured in order to secure tube 6A to second tube receiving portion 290.

Opening 282 which defined down the back of first tube receiving portion 270 would expose first tube 5A were it not for the a corresponding inter-fitting tab portion 291 of second tube receiving portion 290 which is received by opening 282. Tab portion 291 of second tube receiving portion 290 which includes recessed tab 292 fills opening 282 and even completes the inside surface of tube channel 272 of first tube receiving portion 270. Yet, still further, the surface of tab portion 291 which completes the inside surface of tube channel 272 presents, in this example, two teeth or "biters" 304 which project into tube channel 272. These teeth 304, which are shown in a magnified view in FIG. 17A, pinch into the outer surface of tube 5A and further act to secure tube 5A within tube channel 272 of first tube receiving portion 270.

Third embodiment fertilizer knife 210 provides important advantages. First fertilizer tube 5A is typically used to convey liquid NH3 to the subsoil. However, second fertilizer tube 6A is typically used to convey gaseous (vapor) NH3 into the soil. A certain amount of vaporous NH3 will be available when NH3 is being applied. It is preferable to also deliver this excess vapor into the soil. In a typical fertilizer rig, it is generally the case that only some of the fertilizer knives will be used to carry a second fertilizer tube 6A for conveying vaporous NH3 into the soil. Thus, it is advantageous to forgo using a steel fertilizer tube mounted to the back of the knife and replace the thin walled steel tube with a flexible tube which is held by a protective casting. A steel fertilizer tube which conveys even vaporous NH3 becomes very cold and will tend to accumulate ice. The accumulation of ice on fertilizer knives presents problems for the operator which are well known in the art. Accordingly, in most cases, only some of the fertilizer knives carried by a fertilizer implement will need provisions for delivering vaporous NH3. If such provisions, such as a second flexible tube receiving portion 290 can be bolted on as described above, then fertilizer knives can be easily reconfigured to accommodate a second flexible fertilizer tube 6A. Because flexible fertilizer tube 6A is far more insulating than a thin walled steel tube and because it is further surrounded by a casting, ice is far less likely to accumulate around second fertilizer tube 6A. Still further, the inter-fitting geometry of first flexible tube receiving portion 270 and second flexible tube receiving portion 290 makes it possible to bolt them together securely. Further, since first flexible tube receiving portion 270 and second flexible tube receiving portion 290 are preferably chrome carbide castings, it would be very difficult to weld second tube receiving portion 290 to first flexible tube receiving portion 270 as is well known by those skilled in the art. The inter-fitting bolt-on configuration makes it possible to configure knife assemblies quickly and easily and to also configure knife assemblies which do not have a second flexible tube receiving portion.

It is to be understood that while certain forms of this invention have been illustrated and described, it is not limited thereto, except in so far as such limitations are included in the following claims and allowable equivalents thereof.

Having thus described the invention, what is claimed as new and desired to be secured by Letters Patent is:

1. A fertilizer knife, comprising:
    (a) a knife blank which has an upper portion and a lower portion, the upper portion presenting bolt holes suitable for receiving bolts for mounting the fertilizer knife to a fertilizer implement, the knife blank also having a leading edge which extends from an upper end to a lower end and a trailing edge which extends from an upper end to a lower end,
    (b) at least one flexible fertilizer tube receiving portion fixed to the trailing edge of the knife blank, the at least one flexible fertilizer tube receiving portion presenting at least one tube channel which is suitable for receiving a flexible polymer fertilizer tube of a type which conveys liquid fertilizer, at least a portion of the at least one flexible fertilizer tube receiving portion extending to the lower portion of the knife blank adjacent to the lower end of the trailing edge and at least a portion of the at least one tube channel being fashioned to receive and frictionally register with a flexible polymer fertilizer tube in order to retain a flexible polymer fertilizer tube when the fertilizer knife is in operation, the at least one flexible fertilizer tube receiving portion having a lower end, the lower end of the at least one flexible fertilizer tube receiving portion presenting at least one opening which is adjacent to the lower end of the trailing edge which is suitable for allowing liquid fertilizer to escape from the flexible polymer fertilizer tube.

2. The fertilizer knife of claim 1, further comprising;
    a second flexible fertilizer tube receiving portion which is able to be fixed at least indirectly to the knife blank and which is able to be mounted behind the at least one flexible fertilizer tube receiving portion, the second flexible fertilizer tube receiving portion presenting at least one tube channel including at least a portion which is able to frictionally register with a second flexible fertilizer tube, the at least one tube channel also having a lower end which presents at least one opening to allow liquid fertilizer to escape from a second flexible fertilizer tube, the lower end the at least one tube channel of the second fertilizer tube receiving portion being located adjacent to the lower end of the trailing edge of the knife blank.

3. The fertilizer knife of claim 2, wherein; the second flexible fertilizer tube receiving portion is able to be removably mounted to the at least one flexible fertilizer tube receiving portion.

* * * * *